United States Patent Office
3,216,747
Patented Nov. 9, 1965

3,216,747
TUBE COUPLING
Kelvin D. Green, Manhattan Beach, Calif., assignor to Parker-Hannifin Corporation, Cleveland, Ohio, a corporation of Ohio
Filed Sept. 1, 1961, Ser. No. 135,495
3 Claims. (Cl. 285—110)

The present invention relates generally as indicated to a tube coupling, and more particularly, to a union type coupling in which complemental coupling parts are clamped together in fluid-tight engagement.

Union type couplings are, of course, old and well-known in the art, and generally comprise rigid interfitting male and female coupling parts with ground or polished seats that are clamped together as by screw-threaded members. It is also known to provide tube couplings or unions in which the male coupling part has a radially yieldable lip engaged with a seat in the female coupling part.

Contrary to known tube couplings and unions, the present invention has for its principal object the provision of an axially yieldable seal-establishing component integral with one of the coupling parts.

It is another object of this invention to provide a tube coupling or union in which the aforesaid axially yieldable sealing component is pressure-seated, whereby the fluid tightness of the joint is enhanced by increased fluid pressure in the coupling.

It is yet another object of this invention to provide a tube coupling or union which has a plurality of resilient sealing portions which are fluid pressure seated in addition to being seated by resilient deformation thereof during assembly of the coupling.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 1:
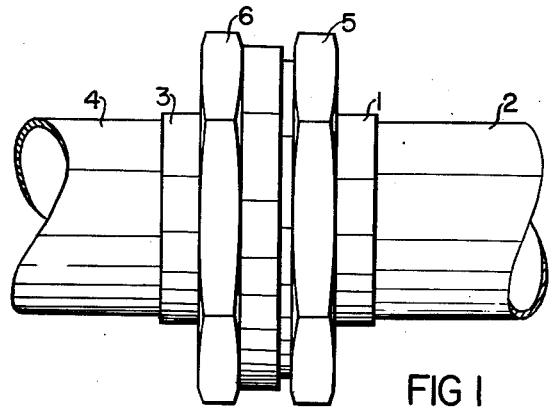
FIG. 1 is a side elevation view of a tube coupling or union in accordance with the present invention.
Figure 2:
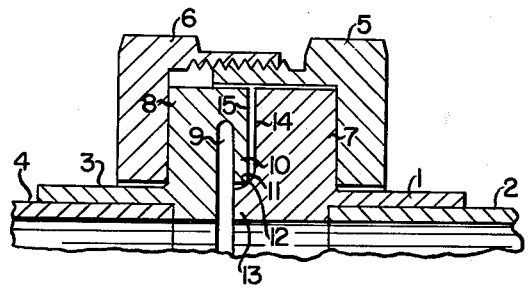
FIG. 2 is a fragmentary enlarged radial cross-section view showing the tube coupling in finger-tight condition.
Figure 3:
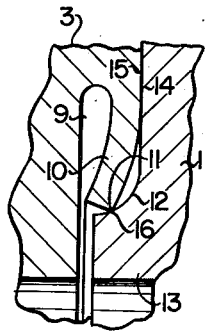
FIG. 3 is a yet larger radial cross-section view showing the fluid-tight joint of the tube coupling when fully tightened.

Referring now more particularly to the drawings, and first to FIGS. 1, 2, and 3 the male coupling part 1 is brazed or otherwise affixed on the end of a tube 2 and female coupling part 3 is similarly affixed on the end of another tube 4. The coupling parts 1 and 3 are drawn together to establish a fluid-tight joint as by means of screw-threaded members 5 and 6 which bear on the respective shoulders 7 and 8 of the coupling parts 1 and 3.

The female coupling part 3 is undercut, as shown at 9, to leave a relatively thin resilient lip 10 of which the inner edge portion 11 contacts the cam surface 12 formed at the base of the rigid axial lip 13 of the male coupling part 1 when the coupling is in finger-tight condition as shown in FIG. 2. It is preferred that the cam surface 12 be rounded, as shown, but as apparent, it may be of frusto-conical or like form. When the coupling is properly made up, the end faces 14 and 15 of the coupling parts 1 and 3 are in abutting engagement as in FIG. 3 and the resilient lip 10 will have been deformed as in FIG. 3 to establish a fluid-tight joint at 16. The abutting faces 14 and 15 limit tightening of the coupling so that the lip 10 is not deformed beyond its elastic limit. It is to be noted that the seal at 16 is maintained by the lip 10 resiliently tending to swing back to its unstressed condition as shown in FIG. 2. Furthermore, fluid under pressure in the undercut 9 acts on the inside of the lip 10 to force it tighter against the cam surface 12.

Figure 4:
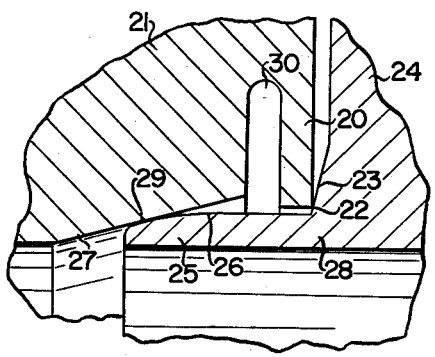
FIGS. 4 and 5 are enlarged radial cross-section views showing the finger-tightened and fully tightened conditions of another form of tube coupling.
Figure 5:
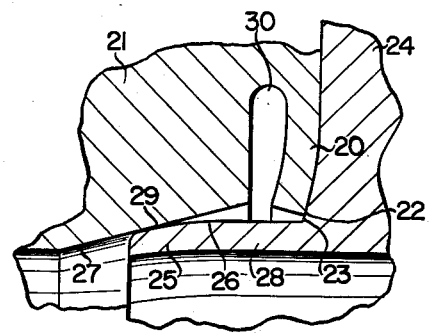

The coupling or union shown in FIGS. 4 and 5 is generally the same as that shown in FIGS. 1, 2 and 3, insofar as the axially swingable, pressure-seated lip 20 of the female coupling part 21 is concerned which is in fluid-tight engagement at 22 with a cam surface 23 except that in FIGS. 4 and 5 the cam surface 23 is in the form of a taper which makes an acute angle with respect to the transverse end face of lip 20 whereas in FIGS. 2 and 3 cam surface 12 is in the form of a radius. In addition, the male coupling part 24 in FIGS. 4 and 5 has an axially protruding tubular and resilient lip 25 with a rounded outer face 26 which makes resilient engagement with the internal frusto-conical seat 27 in the female coupling part 21. This lip 25 is resiliently deformed radially inward about its base portion 28 when the coupling is tightened from the FIG. 4 condition to the FIG. 5 condition. As in the case of lips 10 and 20, the lip 25 is additionally fluid pressure seated to enhance the seal at 29 as the fluid pressure increases. Of course, in the event of leakage past the zone 29 of engagement of the lip 25 with the seat 27, the fluid pressure will be trapped in the undercut 30 and will tend to urge the radially inwardly extending lip 20 axially outward into tighter engagment at 22 with the cam surface 23.

Other modes of applying the principle of the invention may be employed, change being made as regards the details described, provided the features stated in any of the following claims, or the equivalent of such, be employed.

I therefore particularly point out and distinctly claim as my invention:

1. A tube coupling comprising a pair of complemental coupling parts; and means for clamping said parts together in fluid-tight contact; one coupling part having an integral radially inwardly extending flexible lip; and the other coupling part having a cam surface means engageable with the inner end of said lip and effective, upon clamping together of said parts, to axially flex the inner end of said lip to establish a fluid-tight seal at the zone of contact of said cam surface means with said lip; said cam surface means being tapered to impose axial and radially outward forces on the inner end of said lip; said one coupling part also having a tapered seat at a zone axially spaced from said lip and radially inward thereof; said other coupling part having an axially extending flexible lip extending through said radial lip and effective, upon clamping together of said parts, to engage said tapered seat and thereby flex radially inwardly to establish another fluid-tight seal at the zone of contact of said tapered seat with said axial lip; the taper of said seat being sufficient to impose axial and radially inward forces on said axially extending lip; both of said coupling parts having straight, parallel end face means operative to engage each other when both such fluid-tight seals are established to preclude further clamping of said coupling parts together and thus preclude over-stressing of said flexible lips.

2. A tube coupling comprising a pair of complemental male and female coupling parts; means for clamping said parts together in fluid-tight contact; said female part having adjacent an end thereof an undercut which leaves a radially inwardly extending flexible lip; and said male part having a first axial projection which, during clamping together of said parts, engages the inner end of said lip to flex it axially to establish a fluid-tight seal at the zone of contact of said lip with said first axial projection; the outer surface of said first axial projection defining a lip engaging cam surface which is tapered to impose axial and radially outward forces on said lip; said female part also having a tapered seat which is engaged by a second axial projection on said male part when said parts are clamped together to establish another fluid-tight seal at the zone of contact of said tapered seat with said second axial projection; said seat being tapered to impose axial and radially inward forces on said second axial projection; and stop means on said coupling parts which are adapted to come into contact with each other when said coupling is fully made up, thereby preventing over-stressing of said lip and second axial projection and also providing a hit home feeling when said coupling is properly made up.

3. The tube coupling of claim 2 wherein said second axial projection is relatively thin and flexible so as to be flexed radially inward by said tapered seat during clamping together of said parts; and said stop means limit the flexing of said lip and second axial projection within their elastic limits.

References Cited by the Examiner

UNITED STATES PATENTS

| | | | |
|---|---|---|---|
| 935,412 | 9/09 | Rust | 285—334.4 |
| 951,704 | 3/10 | Schmidt. | |
| 2,239,942 | 4/41 | Stone et al. | 285—382 |
| 2,454,557 | 11/48 | Jacobson | 285—382 |
| 2,746,486 | 5/56 | Gratzmuller | 285—110 |
| 3,016,249 | 1/62 | Contreras | 285—336 |
| 3,083,989 | 4/63 | Press | 285—336 |
| 3,145,035 | 8/64 | Hanback | 285—110 |

FOREIGN PATENTS

| | | |
|---|---|---|
| 1,218,572 | 12/59 | France. |
| 1,256,926 | 2/61 | France. |
| 846,043 | 8/52 | Germany. |
| 364,823 | 1/32 | Great Britain. |
| 661,137 | 11/51 | Great Britain. |

CARL W. TOMLIN, *Primary Examiner.*